H. Sigler,
Fish Hook,
Nº 10,761, Patented Apr. 11, 1854.
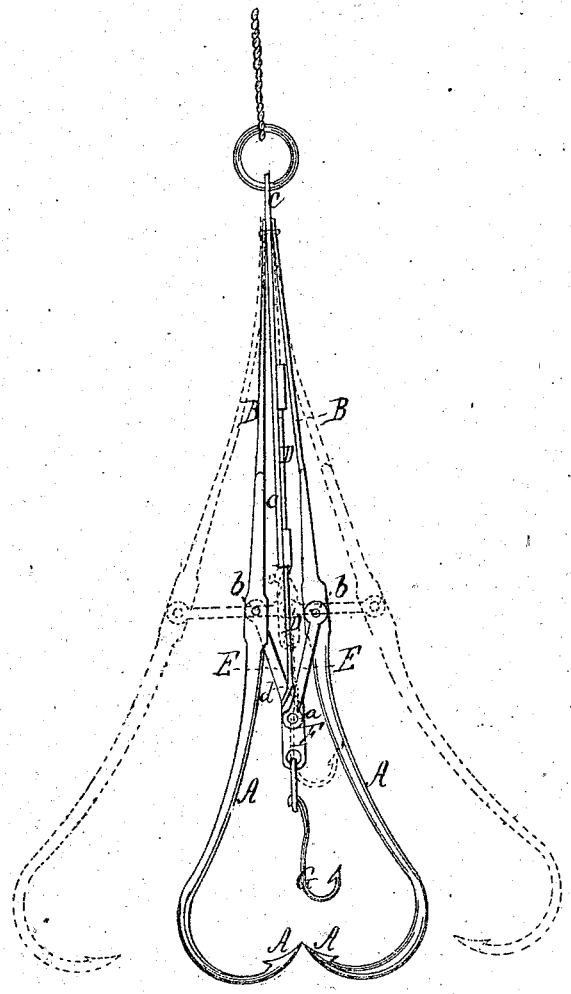

UNITED STATES PATENT OFFICE.

HENRY SIGLER, OF HOUSTON, TEXAS.

IMPROVEMENT IN FISH-HOOKS.

Specification forming part of Letters Patent No. 10,761, dated April 11, 1854.

*To all whom it may concern:*

Be it known that I, HENRY SIGLER, of Houston, in the county of Harris and State of Texas, have invented a new and useful Improvement in the Sockdolager Fish-Hook; and I do hereby declare that the following is a full, clear, and exact description of the same, reference being had to the accompanying drawings, forming part of this specification, in which a side or face view of the hook is represented, the black lines showing it closed or in operation and the red lines indicating its appearance when set or out of operation.

This invention relates to certain new and useful improvements in sockdolager fish-hooks, whereby they are rendered more simple in construction, perfect and sure in their operation, and less dangerous to be handled while baiting; and it consists in making the top portion of the main hooks elastic, and so attaching them to the vertical guide-pieces that they will be made to serve as springs for giving action and forcing them together, and, with two levers or toggle-arms, form a toggle-joint for forcing said hooks apart and retaining them set for a given time; and, in combination with the above, employing a common bait-hook, which is attached to the lower extremity of a regulating-slide and so situated that its end will be some distance above the ends of the spring-hooks, and consequently the fish or animal will have to pass his head between the spring-hooks to reach the bait, in drawing upon which he will instantly draw the toggle-arms out of a horizontal position, and simultaneous therewith operate the spring-hooks, which are caused to take into the body of the fish and hold him perfectly secure, without any chance of escape, owing to the peculiar action of the hook, it biting harder upon its object when the strain is greatest.

To enable others to understand more fully my invention, I will proceed to describe its construction and operation.

A A represent the two spring-hooks, the upper parts or shafts, B B, of which being made of some thin elastic metal, so as to act like a spring and give sufficient force and action to the hooks to enable them to retain the fish or animal which may get between them. These parts B B are secured to the top portion of a vertical flat guide-piece, C, the said piece C having two brackets or guides for the vertical sliding piece D to move up and down in as the hooks are forced apart or drawn together. The sliding-piece D is twisted or turned near its lower extremity so as to form two flat broad faces for one end of each of the toggle-arms E E to fit upon, these arms being secured on the end F by the pin $a$, as seen in drawing, one on each side, the twist in the slide serving as a stop or shoulder to prevent the toggle-arms being drawn upward too far or out of a horizontal line, the shoulder or stop resting against the lower extremity of the guide-piece C when the toggle-arms are in a parallel line, as shown by red lines in the drawing. The other ends of the toggle-arms are secured to the sides and in the center of the stems of the spring-hooks, they being attached on opposite sides by the pins $b$ $b$, upon which they turn, these pins being in a horizontal line with the toggle-arms when the hooks are set to the position shown in red lines in the drawing.

G is the bait-hook attached to the lower end of the slide D a short distance above the beard of the spring-hooks, so that the animal will have to put his head between the points of the spring-hooks to reach the bait, and consequently, when he endeavors to make off with it, he will operate the spring-hooks, and they will securely fasten upon him and retain him, no matter what effort he may make to escape; for it will be evident that the harder he pulls at the middle hook the more firmly the spring-hooks will bite upon him.

To use the hook it must be first set in the manner shown in the drawing by red lines, the toggle-arms in this case occupying a horizontal position, they serving to throw the spring-hooks apart and retain them thus for a certain time, the shoulder $d$ serving to prevent the toggle-arms rising too far above a horizontal line. The center hook is now baited and the whole let down into the water, and as soon as the fish takes hold of the bait and pulls he draws the toggle-arms out of a horizontal line, and consequently the power of the spring is allowed to play and force the hooks together and fasten securely upon its victim, the hooks and arms occupying the positions shown in black lines.

What I claim as my invention, and desire to secure by Letters Patent, is—

Making the top portion of the hooks A A elastic, and so attaching them to the vertical guide-piece D that they will be made to act as springs for giving action to the hooks and forcing them together, and also serve, with the arms E E, to form a toggle-joint for forcing said hooks apart and retaining them set for a given time, and, in combination with the above, employing a common bait-hook, G, which is attached to the lower end of the regulating-slide and so situated that its end will be some distance above the ends of the spring-hook, and consequently the fish or animal will have to pass his head between the spring-hooks to reach the bait, and in drawing upon which he will draw the toggle-arms out of a horizontal position, and simultaneous therewith operate the spring-hooks, which, by their elasticity, are caused to take into the body of the fish and hold it perfectly secure, there being no chance of his escaping, owing to the peculiar action of the hook, it biting harder upon its object when the strain is greatest, substantially as herein described.

HENRY SIGLER.

Witnesses:
  AUG. C. DAWS,
  JOHN VIVEN,
  THOMAS WHITE.